June 10, 1941.                S. MURATA                2,244,959
GLARE SHIELD
Filed Feb. 18, 1939
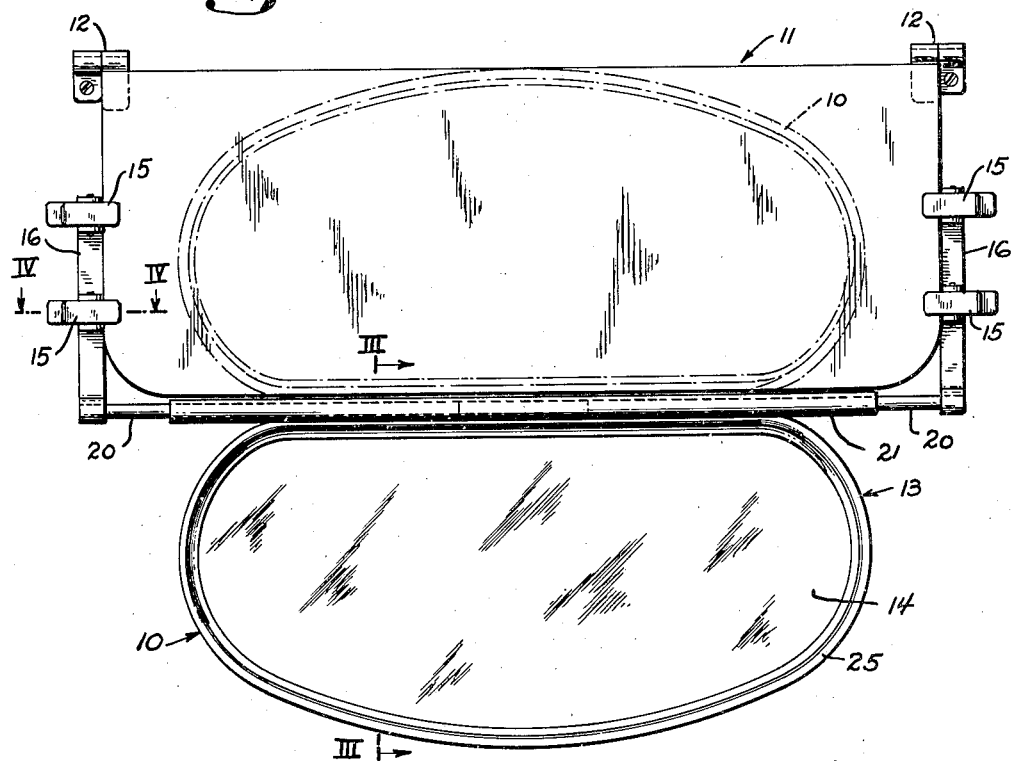
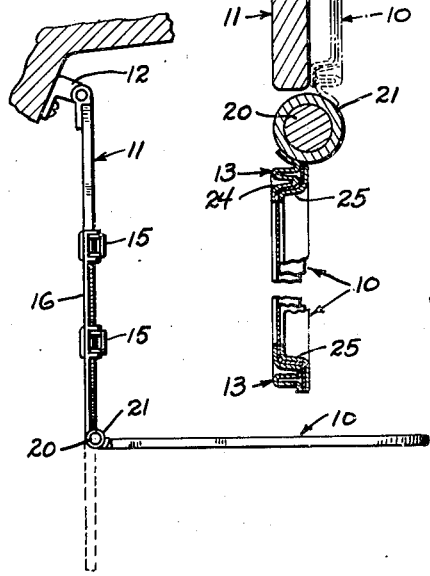
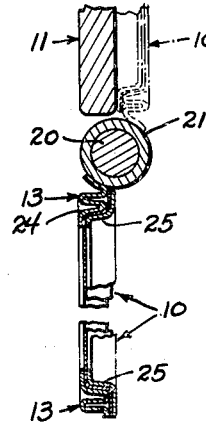
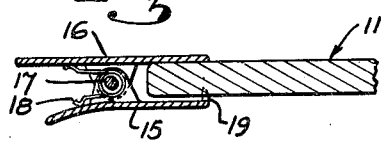
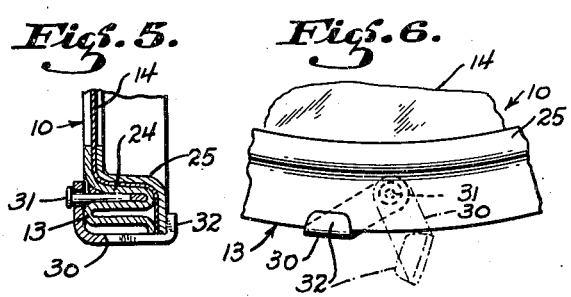
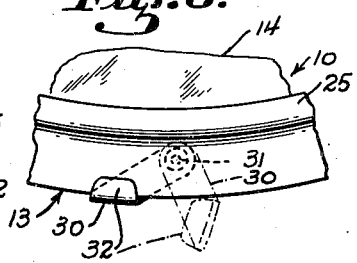
INVENTOR.
Seizo Murata.
BY
Chas. E. Townsend.
ATTORNEY.

Patented June 10, 1941

2,244,959

UNITED STATES PATENT OFFICE 2,244,959

GLARE SHIELD

Seizo Murata, San Francisco, Calif.

Application February 18, 1939, Serial No. 257,093

2 Claims. (Cl. 296—97)

The present invention relates to glare shields, and particularly to devices adapted for use in automobiles to protect the driver's eyes from unusual light or glare.

The conventional sunshade commonly used in automobiles is in the form of a panel hinged to the interior of the driving compartment just above the windshield, so that the driver may swing it down to a position where it will protect his eyes from the direct rays of the sun. These sunshades afford no relief from indirect sunlight nor from glare resulting from various other causes, such, for example, as the lights from approaching vehicles at night.

It is the object of the present invention to provide a glare shield capable of attachment to the conventional sunshade of an automobile, and constructed for adjustable positioning by means of such attachment.

It is a further object of the invention to provide a glare shield simple and inexpensive in construction, and in which the filter medium may be conveniently released if it becomes damaged or worn or if it is desired to change the color or other filtering properties of same.

One form of my invention is illustrated in the accompanying drawing, although the invention is not intended to be limited by the form shown, and is described in detail in the following specification, wherein reference is made to the drawing, and wherein further objects and advantages of the invention are made apparent.

In the drawing—

Fig. 1 is a front elevation of a conventional sunshade with a glare shield embodying the present invention attached thereto;

Fig. 2 is an end elevation of the sunshade and glare shield illustrated in Fig. 1, showing the glare shield in a different position;

Fig. 3 is an enlarged sectional view taken along line III—III of Fig. 1;

Fig. 4 is a sectional view taken on line IV—IV of Fig. 1;

Fig. 5 is an enlarged sectional view of the frame shown in Fig. 3, illustrating a locking means attached thereto; and Fig. 6 is an enlarged fragmentary view in elevation of the same.

The invention, as illustrated in the drawing, and especially in Figures 1 and 2, is shown as comprising a glare shield, generally indicated at 10, attached to the conventional sunshade 11. The sunshade 11 is usually secured at a position above the windshield in the driver's compartment of an automobile by means of pivotal supporting brackets shown at 12. Through the medium of the brackets 12, the sunshade 11 may be swung to a horizontal position against the ceiling of the driver's compartment when it is not in use, or lowered to the vertical position shown when the driver is annoyed by the direct rays of the sun. The glare shield, which comprises a frame 13 embracing a filter medium 14, is pivotally connected along the lower edge of the sunshade through the medium of the adjustable bracket, best shown in Figures 1 and 2. This adjustable bracket comprises spring clips 15, which engage the edges of the sunshade, and which are preferably arranged in pairs supported on plates 16.

Details of construction of the clips 15 are illustrated in Fig. 4, in which the plates 16 are shown as supporting pivot pins 17, which in turn pivotally support the clip members 15. A spring 18 is provided to urge the clip member 15 toward a closed position so that a serrated edge 19 on the clip engages with the face of the sunshade to form a firm connection therewith. The plates 16, which are thus supported adjacent and parallel to the vertical edges of the sunshade, support inwardly extending rods 20 at their lower ends. The rods 20 extend toward each other in alignment and enter opposite ends of a tube 21 which is free to pivot about the rods. The fit between the rods 20 and the tubes 21 is sufficiently tight to cause frictional resistance to turning of the tube upon the rods, and this resistance to turning may be increased if desired by imparting a very slight bend to either or both of the rods 20.

The frame 13, which embraces the filter medium 14, is secured to the tube 21. As the plates 16, with their associated clips 15 and rods 20, are formed as separate members, the device may be applied to sunshades of different dimensions by simply varying the distance that the rods 20 enter the tube 21. Likewise by virtue of this construction the glare shield may be adjustably positioned with relation to the sunshade, as it is free to slide to left or right on the rods 20.

Due to the pivotal connection above described, the glare shield may be swung from its operative position, illustrated in full lines in Fig. 1, to the inoperative position, illustrated in dotted lines. Furthermore, when the sunshade is not in use, it may be swung upwardly with the glare shield positioned on its top side and out of sight. The glare shield may also be raised and lowered for the accommodation of drivers who sit in a different position in the automobile, and to afford protection from glare striking the eyes from different levels, by swinging the sunshade upwardly or downwardly about its pivotal supports 12 and then adjusting the glare shield about the rods 20 until it assumes a substantially vertical position.

The frame 13 may be of any suitable construction, and any light filtering medium may be used within the frame. An unbreakable filter medium is, however, preferred, and any of several cellulose or plastic base compositions are suitable for this purpose and may be obtained in different colors to suit the taste of the individual driver. In order to provide a great range in filter mediums, I have found it desirable to use a very thin substance of the nature of Cellophane, which may be obtained in different colors, and of which more than one thickness may be used, and more than one color, so that the user may adapt the glare shield to his own particular needs by placing in the frame any colors or combination of colors, and any number of thicknesses of the filter medium that is desired.

In order that the filter medium may be readily changed, I have provided a frame, the construction of which is illustrated in Fig. 3, in which the main frame portion 13 is formed preferably of pressed metal with a cross-section which provides an inclined surface 24 surrounding the frame opening. A clamping frame 25, also preferably constructed of pressed metal, fits within the frame 13 and causes the filter medium 14 to be gripped around its periphery at the inclined surface 24 and tightly stretched across the frame opening. The clamping frame 25 is frictionally held in this position and may be removed for the purpose of removing and replacing the filter medium 14. Where thin sheets of colored material such as Cellophane are used as a filter medium, more than one sheet may readily be placed in the frame in the manner just described so that it is possible to increase the thickness, to combine colors, or to otherwise vary the filtering properties of the glare shield.

Ordinarily, the frictional contact between the frame 13 and the clamping frame 25 will be sufficient to retain these frames against separation. In order positively to prevent their separation, I have provided the locking means illustrated in Figures 5 and 6, in which a U-shaped locking member 30 is shown as pivotally mounted on a pin 31, which is sweated into one of the grooves of the frame 13. Finger 32, bent from one end of the member 30 at an angle thereto, as shown in Figure 6, is arranged to underlie the outer edge of the clamping frame 25 when in the full line position illustrated in Fig. 6, and to swing free of said edge when the locking member is pivoted about the pin 31 to the dotted line position illustrated in Fig. 6. Such locking members may be employed in any desired number at suitably spaced intervals around the edge of the frame to secure the clamping frame against accidental removal.

While the foregoing description is directed to a specific form of the invention, it is to be understood that various changes may be resorted to in the construction and arrangement of the parts described within the scope of the appended claims.

Having thus described my invention, what I claim and desire to secure by Letters Patent is:

1. A bracket for securing a glare shield to a generally rectangular sunshade of an automobile which comprises, means engageable with opposite edges of the sunshade and supporting a pair of rods extending coaxially and toward each other parallel to another edge of the sunshade, and a tubular member embracing the ends of said rods and supporting the glareshield whereby the rods may be adjusted to and away from each other and the glareshield will be free to pivot and slide with respect to the rods.

2. A bracket for securing a glare shield to a generally rectangular automobile sunshade, which comprises a pair of plates adapted to lie parallel to two opposite vertical edges of the sunshade, means carried by said plates engageable with said edges to retain them in position, a pair of rods supported at the lower ends of said plates and extending coaxially toward each other and parallel to a horizontal edge of the sunshade, and a tubular member embracing the ends of said rods and supporting the glare shield whereby the rods are free to move to and away from each other upon attachment of the bracket to sunshades of different widths and the glare shield will be free to pivot and slide with respect to the rods.

SEIZO MURATA.